United States Patent [19]

Higby

[11] 4,376,913

[45] Mar. 15, 1983

[54] METHOD AND APPARATUS FOR SYNCHRONOUSLY DRIVING AC SYNCHRONOUS MOTORS

[75] Inventor: Bernard I. Higby, McKees Rocks, Pa.

[73] Assignee: Horix Manufacturing Co., Pittsburgh, Pa.

[21] Appl. No.: 225,844

[22] Filed: Jan. 16, 1981

[51] Int. Cl.³ .............................................. H02P 5/46
[52] U.S. Cl. ....................................... 318/85; 318/41; 318/49; 318/69
[58] Field of Search ...................... 318/85, 41, 49, 112, 318/67, 78, 69, 70, 72, 52, 345 C, 345 G, 345 B, 345 F; 363/123, 135, 96, 95; 53/467, 266 R

[56] References Cited

U.S. PATENT DOCUMENTS

| | | | |
|---|---|---|---|
| 3,461,367 | 8/1969 | Takeyasu et al. | 318/345 B X |
| 3,600,655 | 8/1971 | Karlin et al. | 318/85 X |
| 3,757,179 | 9/1973 | Pedersen | 318/85 |
| 3,967,170 | 6/1976 | MacDonald et al. | 318/85 |

Primary Examiner—Ulysses Weldon
Attorney, Agent, or Firm—Carothers and Carothers

[57] ABSTRACT

A plurality of AC synchronous motors used to drive respective machines in a manufacturing or packaging assembly line or system are driven in speed and phase synchronization. A common AC current supply signal is inverted to provide one polyphase set of series of controlled frequency low voltage DC pulses in a lead inverter. This polyphase set of pulses are amplified and utilized to drive the AC synchronous motor for the lead machine in the system. This same set of polyphase pulses are also transmitted directly to follower inverters respectively and there amplified to drive respective synchronous motors in the system to not only insure speed synchronization but also absolute phase synchronization in driving all machines in the line. When the frequency of the polyphase set of pulses is varied to correspondingly drive the AC synchronous motors at predetermined speeds, phase synchronization of the motors will always be insured. The AC synchronous motor drives are further adapted to automatically position all of the machines in the line to their respective start positions for position synchronization of the line through the use of position sensors on each machine.

9 Claims, 4 Drawing Figures

METHOD AND APPARATUS FOR SYNCHRONOUSLY DRIVING AC SYNCHRONOUS MOTORS

The present invention relates generally to electric drive systems for synchronously driving a plurality of machines in a manufacturing or packaging assembly line or system, and more particularly to AC inverter lead/follower systems for synchronously driving respective AC synchronous motors.

A manufacturing, packaging or assembly line which is adapted to sequentially conduct successive steps of manufacture, packaging or assembly on articles moving in the assembly line, for example in a bottling line, which might include a cleaner, a filler and a capper for successively cleaning the bottles, filling the same and capping them, it is necessary that all the machines in the line be driven in synchronization with each other. With the bottling line example, if the machines are not driven in synchronization, the bottles will come into contact with each other, bottle jams in the system will occur along with loss of bottle control, and a decrease in line flexibility and an increase in noise level will also occur. The packaging line must be started up with each machine in position synchronization with the other machines and the line speed of the system must be variable while maintaining all machines in the system in speed synchronization.

In a typical manufacturing or packaging line, any number of machines may be employed or utilized. For example, in a bottling line, machines such as uncasers, unscramblers, cleaners, fillers, cappers, strip stampers, labelers, printers and coders, etc., may be made a part of the system. Each of these machines is driven by its own AC synchronous motor, as the speed of a synchronous motor will not vary with the load that the motor drives, and in addition, synchronous motors have well defined speed-to-frequency characteristics, which means that the speed of the synchronous motors can be exactly controlled by the frequency of the motor drive signal. In addition, the voltage-to-frequency characteristics for a synchronous motor are constant for each motor. Thus, each machine in the packaging line to be synchronized is equipped with an AC synchronous motor, and each motor is driven by an AC inverter having a variable frequency output. Each AC inverter takes an AC signal phase input and converts it to a variable frequency, variable voltage, three-phase output. In addition, each AC inverter in the system is synchronized with a lead inverter which controls the entire system. The line speed is varied by delivering variable frequency inputs to each synchronous motor and varying the frequency varies the speed. A master control and follower controls are located at each machine to control the lead inverter and follower inverters respectively. However, under normal operating conditions, the line is controlled from the master control.

By way of example for prior art systems, a simple bottling line consists of a cleaner, filler and capper, the cleaner will be the lead machine, the filler and capper will be follower machines, and likewise, the AC inverter drive for the cleaner is the lead inverter and the inverters driving the AC synchronous motors for the filler and capper are designated as follower inverters.

The lead inverter consists of a solid-state electronic device that receives an AC current and changes it to a series of controlled frequency and voltage DC pulses. The frequency of these pulses can be increased or decreased by varying the control voltage within the inverter. These pulses thus effectively generate a variable frequency AC current. By using this current to drive the lead AC synchronous motor, the motor speed can be varied by varying the frequency of the inverter output. Since the speed of an AC synchronous motor is directly proportional to the frequency of the applied current, a precisely controlled variable speed AC motor drive system is obtained. Each of the follower inverters operates in the same manner to drive its respective AC synchronous motor, however, the frequencies generated in the follower inverters are controlled from a lead signal derived from the lead inverter so that the entire system is driven with exact speed synchronization.

However, in inverter-driven synchronizing systems of the prior art, the lead inverter transmits a single-phase oscillator signal to the follower inverters for system speed synchronization, and each follower inverter then generates its own three-phase signal to drive its respective synchronous motor. The problem with this prior art method is that it introduces the possibility of loss of phase synchronization in the system, whereas it is important to assure positive phase synchronization, as well as positive speed synchronization, in the line. In such prior art systems, phase synchronization may be lost by any one of several means, for example, each follower inverter generates its own three-phase signal with its own internal logic sections, and the component values and drift may readily vary from the logic section of one inverter to that of another follower inverter, causing the system to lose phase synchronization.

As stated, phase synchronization is just as important as speed synchronization. Two or more machines in the line can be running in exact speed synchronization but be out of phase with each other. For example, if it is assumed that a point on the rotary filler is designated as the zero position, there is a corresponding point on the capper if the two machines are in phase. If the machines drift out of phase, the two zero position points would not match and the capper and filler, while both running at the same speed, are now out of phase. While at first this may not be very serious since the phase separation is not more than a small drift as opposed to a major move, nevertheless, if the machines in the system are not in phase at all times, they will continue to drift apart, ultimately requiring retiming of each machine to restore proper bottle position. In the extreme case, such machines drifting out of phase can cause bottle jams and breakage.

A further problem is encountered with the synchronizing systems of the prior art. As can be seen from the foregoing discussion, it is also important that when the manufacturing or packaging line is started up, all machines must first be positioned in physical synchronization with each other. With the systems of the prior art, it is not possible to accomplish this automatically, and each machine is individually positioned. In the prior art systems, the lead machine is first jogged until it is in the proper starting position, then each follower machine is jogged or stepped until it is in the proper starting position. This must be accomplished by the operator at each individual machine, which is an undesirably time consuming operation.

It is a principle object of the present invention to eliminate the aforementioned disadvantages of the inverter driven synchronizing systems of the prior art, and to provide a system which furnishes not only positive speed synchronization but also assured phase synchronization, and to further provide a synchronizing drive system which automatically with one control positions all machines into physical position synchronization with each other and then starts up the entire line.

As previously described with regard to inverter lead/follower systems of the prior art, speed synchronization is accomplished by sending the lead unit generated oscillator signal to the follower inverters, which does not insure phase synchronization. The system of the present invention instead converts the oscillator signal in the lead inverter to polyphase or three-phase sets of signals and these three-phase sets of signals are then bussed to the follower inverters instead of the oscillator signal. Thus, like phases in all inverters are required to turn on and off at the same time, thereby making it impossible for the inverters to lose phase synchronization.

The inverter driven synchronizing system of the present invention is further novel in that it provides automatic re-position sync. If the machines in the line are out of sync and the start button for the system is actuated, the last follower or downstream machine will automatically start and move to its in-sync position and shut down, and each succeeding machine upstream will do the same. When the lead machine is in sync, the line will then automatically start up and resume whatever speed it had been previously running, again in total sync. Thus, the line will automatically re-sync, if necessary, every time it is turned on.

To synchronously drive a plurality of AC synchronous motors in phase synchronization in accordance with the teachings of the method and apparatus of the present invention, an AC current supply signal is inverted to provide one polyphase set of series of controlled frequency low voltage DC pulses, and this one polyphase set of pulses is amplified by a plurality of different or independent amplifiers corresponding in number to the plurality of the motors to be driven in the system. These independently amplified polyphase set of pulses, derived from one polyphase set for control, are then utilized to respectively drive the synchronous motors with assured phase synchronization.

The frequency of this one polyphase set of pulses may be varied in the lead inverter to a predetermined value corresponding to the desired speed at which the motors are to be synchronously driven. Generally, this polyphase set of signals will be a three-phase signal in the typical application.

Further improvements in the system of the present invention may be provided by positioning a position sensor on each machine in the line to indicate respectively when each machine is in a start position, which is synchronized with the start position of the other machines in the line, for position synchronization on the line. Electrical position signals are generated respectively by the position sensors when the respective machines are in their start position and the presence of these position signals are respectively detected. Each of the synchronous motors is driven until its respective machine advances to its start position, where it is stopped upon sensing of the position signal and held there as it attains its respective start position by utilizing these electrical position signals to initiate respective DC hold brakes on the motors. Then, drive of all the motors is simultaneously initiated automatically in phase synchronization with their respective amplified polyphase sets of pulses when the simultaneous presence of the aforesaid electrical position signals from all machines is detected, thereby indicating that all machines in the line are in position synchronization with each other.

Other objects and advantages appear in the following description and claims.

The accompanying drawings show, for the purpose of exemplification without limiting the invention or the claims thereto, certain practical embodiments which illustrate the principles of this invention wherein:

Figure 1:
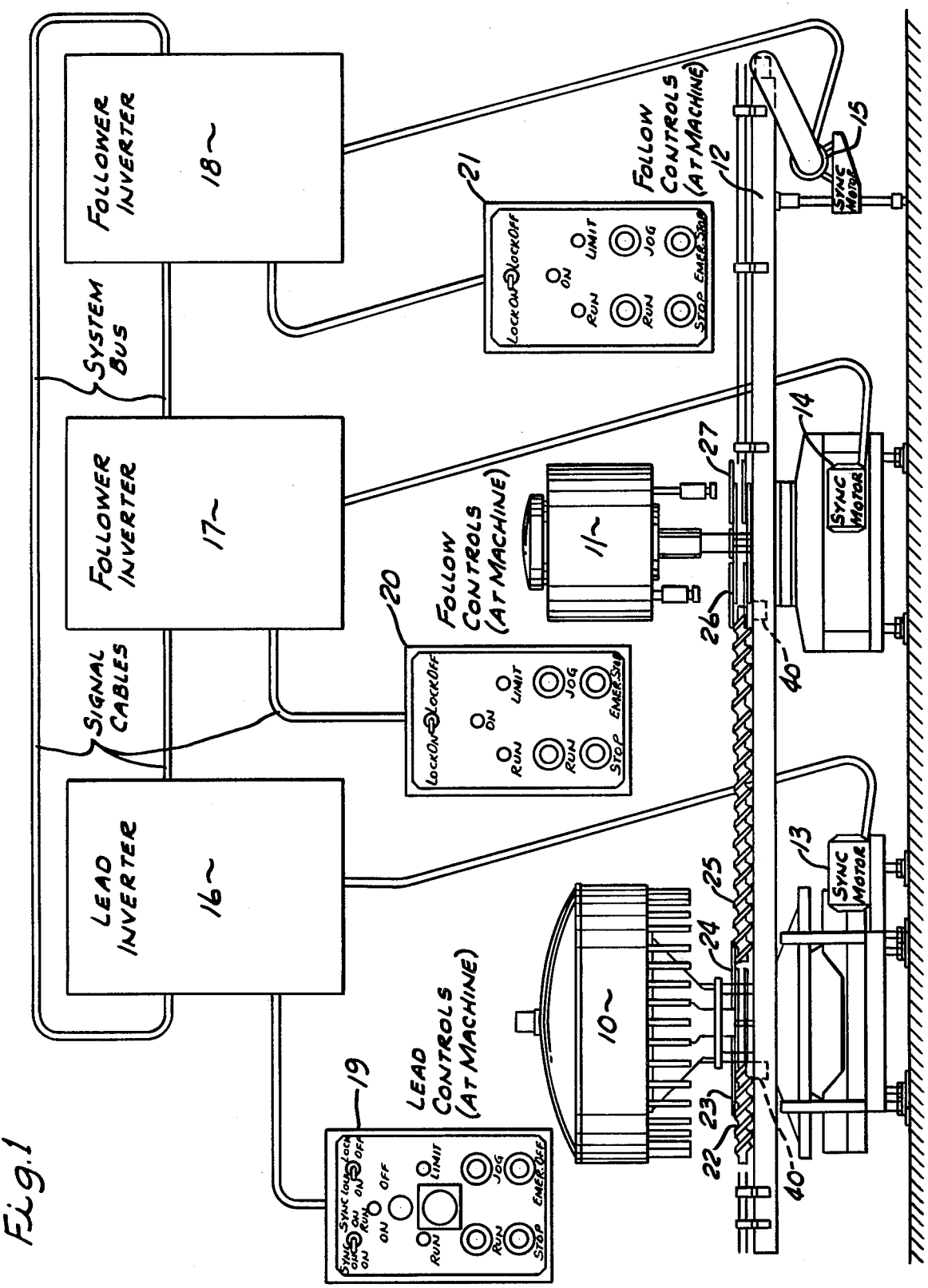
FIG. 1 is a diagrammatic view in front elevation illustrating a bottle packaging line utilizing the drive control of the present invention for synchronously driving the machines in the line.

As has been previously pointed out, there is no limit to the number of machines or types of machines which may be employed in the manufacturing or packaging assembly line. For simplicity, the drive control of the present invention will be described in connection with a bottling line as illustrated in FIG. 1. This bottling line consists of a filler 10 as the lead machine and a capper 11 and a conveyor 12 as the follower machines. The lead machine or filler 10 is driven by AC synchronous motor 13, and the follower machines consisting of the capper 11 and the conveyor 12 are respectively driven by AC synchronous motors 14 and 15. Lead synchronous motor 13 is driven by lead AC inverter 16, and synchronous motors 14 and 15 are respectively driven by follower AC inverters 17 and 18. Lead controls 19 and follower controls 20 and 21 are used to run, stop, jog, and emergency stop the system or line. The lockoff switches and limit lights on the controls are only utilized when the machines are to be run independently of the line, such as for repair or cleaning.

In-feed timing screw 22, in-feed star 23, out-feed star 24 and take-away conveyor screw 25 are all mechanically tied together with filler machine 10. In a similar manner, in-feed star 26 and out-feed star 27 are mechanically tied to capper machine 11. These machines, together with conveyor 12 are machines which may be found in the conventional market.

The drive control of the present invention for synchronously driving the AC synchronous motors 13, 14 and 15 at the same speed and phase, include AC inverters 16, 17 and 18 which have polyphase, in this instance three-phase, variable frequency output signals consisting of three-phase sets of series of controlled frequency low voltage DC pulses which are amplified to respectively drive the motors in phase at synchronized speeds. These AC inverters take an AC input signal and convert it to a variable frequency, variable voltage three-phase output to drive the AC synchronous motors 13, 14 and 15. As the frequency increases, the voltage driving the synchronous motors also increases in proportion to the increase in frequency. This is required due to the characteristics of AC synchronous motors.

In the drive control of the present invention, lead inverter 16 generates one low voltage polyphase or three-phase DC pulse set and transmits or busses this one low voltage polyphase DC pulse set also to follower inverters 17 and 18. The lead inverter and each of the follower inverters then respectively or independently amplify this same three-phase DC pulse set and thereby drive their respective synchronous motors 13, 14 and 15. Since each inverter is amplifying the same three-phase DC pulse set, it is impossible for the system to be out of phase synchronization. With the drive controls of the prior art, only a single oscillator or clock pulse was transmitted from the lead inverter to the follower inverters, and in the prior art systems, the follower inverters then each generated their own respective three-phase DC pulse set for amplification, which created conditions for loss of phase synchronization.

Figure 2:
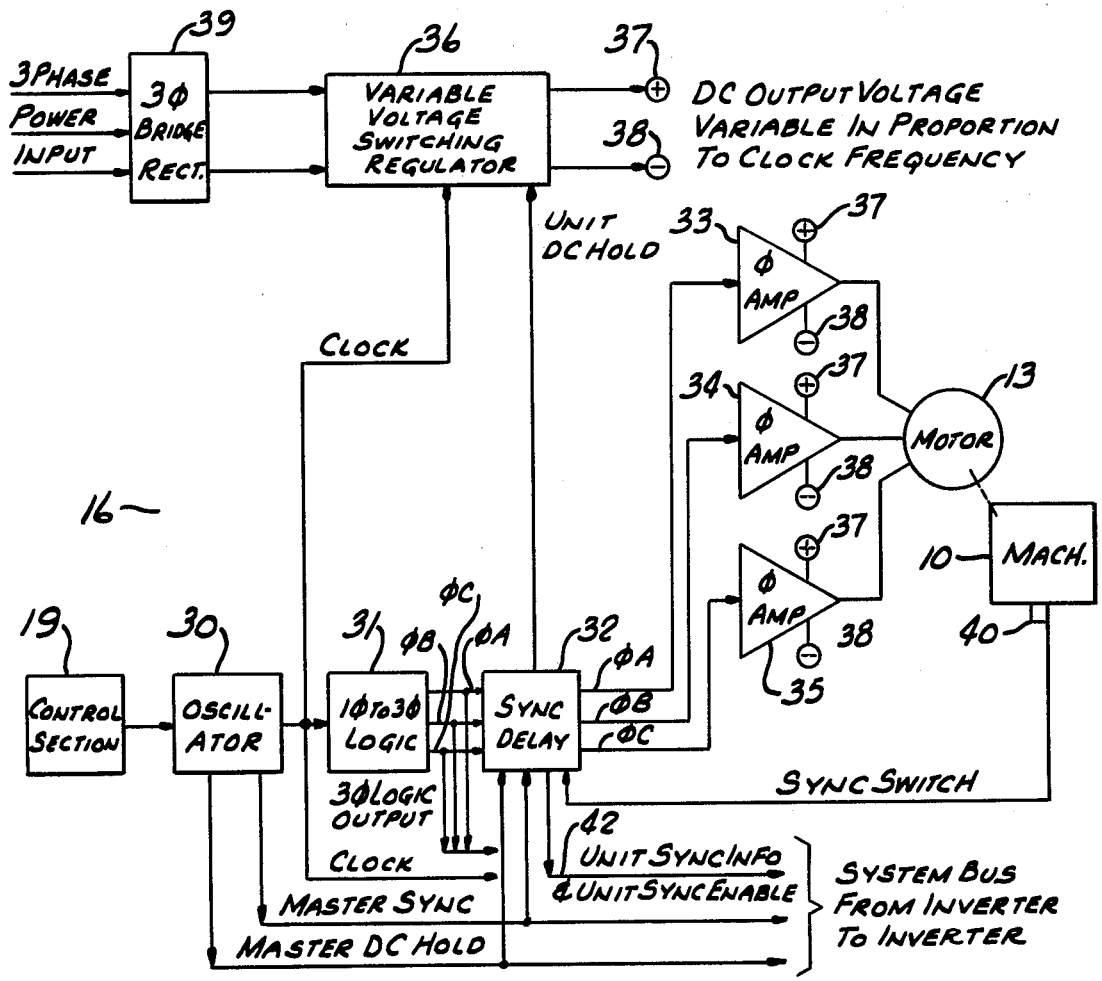
FIG. 2 is a block schematic diagram illustrating the lead inverter of the synchronous control in FIG. 1.

Referring to FIG. 2, the lead inverter 16 of FIG. 1 is illustrated in block schematic form. The same elements of the lead inverter and lead machine in FIG. 1 are herein illustrated with the same reference numeral designations.

In FIG. 2, lead AC inverter 16 is provided with control section 19 which includes all of the controls for starting, stopping, initial position synchronization of the machines, and for setting or varying the system speed. When the system speed control is varied, to increase or decrease the speed of the bottling line with control section 19, this acts on oscillator 30 to vary the output frequency thereof. The frequency of the clock pulse generated at the output of oscillator 30 increases proportionately with the speed selected. This single-phase clock pulse is then fed into the single-phase to three-phase logic converter 31 which through the use of conventional logic circuitry, converts the single-phase clock pulse into a three-phase controlled frequency low voltage DC pulse set consisting of phase signals A, B and C, which, of course, are each 120° out of phase with the others to provide a true three-phase low voltage DC pulse set which is effectively a three-phase AC signal for the purpose of driving motor 13.

This low voltage three-phase DC pulse set is then transmitted to sync and delay circuit 32 which incorporates a synchronization logic section and a transmission gate section. When the sync logic section of sync and delay circuit 32 determines that all machines in the system are in correct position synchronization, it permits the transmission gate section to pass the low voltage controlled frequency DC three-phase pulse set consisting of signals A, B and C, to pass on for amplification respectively by amplifiers 33, 34 and 35 to ultimately drive AC synchronous motor 13. The drive speed of synchronous motor 13 is, of course, variable depending upon the frequency of the three-phase pulse set A, B, C, the frequency of which is in turn dependent upon frequency of the clock pulse generated from oscillator 30.

The sync logic section of sync and delay circuit 32 also includes electronics to apply a DC hold voltage to motor 13 to hold and delay the drive of motor 13 until all machines are in position synchronization with each other.

As previously explained, due to the characteristics of AC synchronous motors, as the frequency with the three-phase pulse set A, B, C increases to correspondingly increase the speed of synchronous motor 13, the drive voltage applied to motor 13 must also proportionately increase. This is accomplished through the use of conventional variable voltage switching regulator 36. Variable voltage switching regulator 36 provides a DC positive and negative output voltage at terminals 37 and 38, respectively, which might typically vary from 0 to 300 volts, plus or minus DC, depending upon the frequency of the clock pulse from oscillator 30 which is also fed to switching regulator 36, as illustrated in the Figure.

Switching regulator 36 is conventionally fed from a three-phase AC power source which is rectified by three-phase bridge rectifier 39 to supply a DC input to switching regulator 36, which might typically be 320 volts DC.

The variable DC output of voltages from terminals 37 and 38 of switching regulator 36, are fed to amplifiers 33, 34 and 35 as indicated, thereby effectively providing a variable voltage/variable frequency output from the amplifiers for driving synchronous motor 13.

As indicated in FIG. 2 by the dashed line, motor 13 drives machine 10. Machine 10 is further provided with a position sensor 40 which senses when machine 10 in the assembly line is in position synchronization with each of the other machines in the bottling line. This sensor 40 may be any conventional sensor such as an optic sensor, magnetic sensor, limit switch, etc., which is capable of generating an electrical signal when the machine is in proper position synchronization as determined by its physical positioning in relation to the assembly line. This sensor 40 is illustrated in FIG. 1 as an optical sensor which views input star wheel 23 of filler 10 and detects the existence of a gap or pocket in the star wheel to determine that the machine is in proper position synchronization for line start up and operation. Of course, the sensor may be positioned anywhere on the machine where it can sense machine position, and need not be used in direct conjunction with the star wheels.

This position sensor 40 thus acts as a synchronization switch and conveys a sync switch signal back to sync and delay circuit 32 when proper position synchronization of the machine 10 is obtained.

Sync and delay circuit 32 also transmits and receives synchronization information to and from the other follower inverters by way of the unit synchronization information bus 42. Thus, sync and delay circuit 32 operates to detect the presence of the sync switch signal from detector 40. When this sync switch signal is detected, and at the same time from the unit sync information bus the sync and delay circuit 32 also detects that the other follower inverters in the system indicate that their respective machines are not yet in position synchronization, sync and delay circuit 32 will operate to turn off its transmission gates thereby closing off the transmission of the three-phase pulse set A, B, C to motor 13, and in addition, circuit 32 will send a unit DC hold signal to switching regulator 36 to provide a constant DC voltage to the input of motor 13 causing motor 13 to hold or brake steady. When the other machines in the bottling line are in proper start-up position, this information is conveyed by signal over the unit sync information bus 42 to sync and delay circuit 32. All machines in the system being in proper position synchronization, sync and delay circuit 32 will operate to open its transmission gate section to transmit the three-phase signal set to drive motor 13, and at the same time, it will cease transmission of the unit DC hold signal to switching regulator 36 which will then provide the proper vertical DC output voltage in accordance with the clock pulse being transmitted thereto. At the same time, sync delay circuit 32 will likewise initiate operation of the follower inverters and follower machines in speed and phase synchronization with the lead inverter and machine. This is accomplished by transmission of all information through the system bus which busses the signals from inverter to inverter. Unlike the drive control systems of the prior art which transmit only the clock pulse to successive follower inverters for speed control, the drive control of the present invention also transmits the three-phase low voltage logic output signal from logic circuit 31 on the system bus to each follower inverter. This will be described in more detail in relation to FIG. 3, which schematically illustrates the follower inverters.

For information purposes, it should be borne in mind that with the drive control of the present invention, as well as with drive controls of the prior art, the frequency of the drive pulses for the AC synchronous motors are varied or controlled to gradually increase when starting up the machine to provide smooth acceleration, and gradually decrease to provide smooth and synchronous deceleration of the system.

Figure 3:
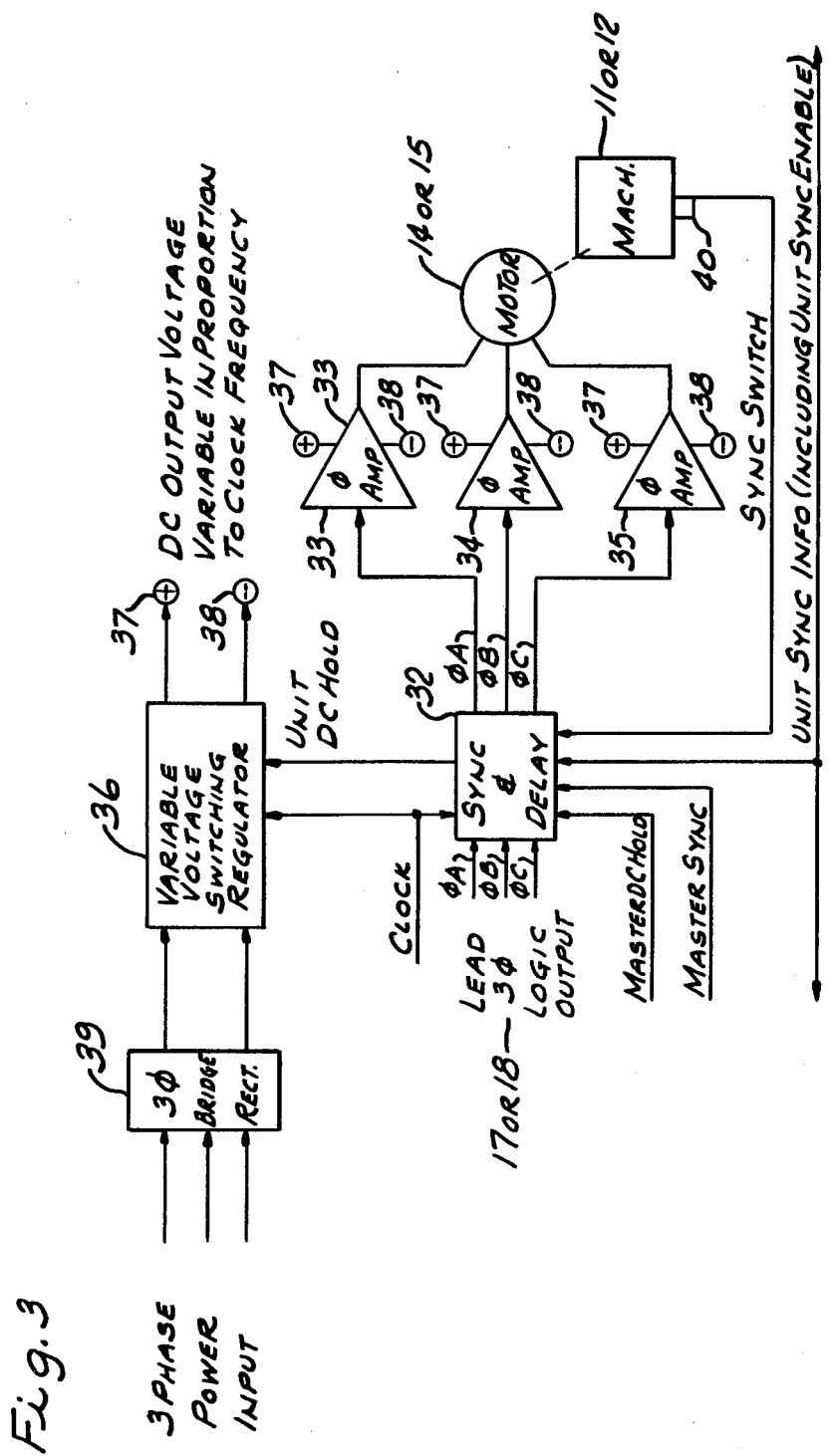
FIG. 3 is a block schematic diagram illustrating the follower inverters of the synchronous control of FIG. 1.

Referring next to FIG. 3, the schematics of the follower inverters 17 and 18 are illustrated. The follower inverters are identical in structure and operation with the lead inverter 16 illustrated in FIG. 2 with the exception that the control section 19, oscillator 30, and one-phase to three-phase logic section 31 of inverter 16 are omitted in the follower inverters 17 and 18. Information from these omitted sections are transmitted from the lead inverter to the follower inverters via the system bus.

The follower inverters as illustrated in FIG. 3 operate identically, and accordingly the same elements are designated with the same reference numerals as those in FIG. 2. Instead of merely transmitting the oscillator output or clock pulse to the follower inverters as is done with the drive control systems of the prior art, the three-phase logic output consisting of the low voltage DC pulse set from the output of the one-phase to three-phase logic circuit 31 of inverter 16 is itself directly transmitted to follower inverters 17 and 18, as indicated, at the input of sync and delay circuit 32 of the follower inverter shown in FIG. 3. The prior art drive controls included a one-phase to three-phase logic section in the follower inverters as well as the lead inverter, which lends to the undesired possibility of losing phase synchronization in the system in view of the fact that each inverter of the prior art type would generate its own three-phase pulse set.

In addition to the transmission of the clock pulse and the three-phase pulse set signal A, B, C, a master DC hold signal, as master sync signal and unit sync information is transmitted between all inverters as indicated. Transmission of this information permits the sync and delay circuit 32 of each inverter to communicate with the sync and delay circuit 32 of the other inverters, so that each inverter on command from the lead inverter, can individually pre-position its machine in position synchronization with all other machines in the line and transmit this information to the lead inverter, which, upon obtaining position synchronization of its machine, commands all inverters to simultaneously and synchronously drive all machines.

If for some reason the packaging line is out of position synchronization, as for example, one of the machines or all of the machines are cleaned or otherwise stopped and jogged individually to place them out of synchronization, the drive control of the present invention will automatically position sync all machines and then automatically start up the line. This is accomplished as follows. When the start button on the control section 19 of lead inverter 16 in FIG. 2 is operated, the master sync signal to all inverters will indicate that the line is out of sync, as this information is fed to the lead inverter from the unit sync information bus. With this information, the last follower machine and follower inverter 18 through its sync and delay circuit 32 will move or jog machine 12 to its in sync position detected by detector 40 and shut down through the use of the unit DC hold signal. This information is transmitted back to the lead inverter and the next downstream machine inverter. Inverter 17 will then go through the same procedure, and when machine 11 is jogged to its in sync position, it will also shut down. When the lead machine likewise automatically positions itself in sync, the master DC hold signal will be off, the master sync signal will indicate that all machines are in sync, and the line automatically starts up and resumes whatever speed it has been previously set for by control section 19 of lead inverter 16, and again runs in total synchronization. The line automatically re-syncs every time it is turned on. The master DC hold signal from the lead inverter is utilized by the lead inverter to hold all machines at a stop in synchronization when the packaging line is stopped.

Figure 4:
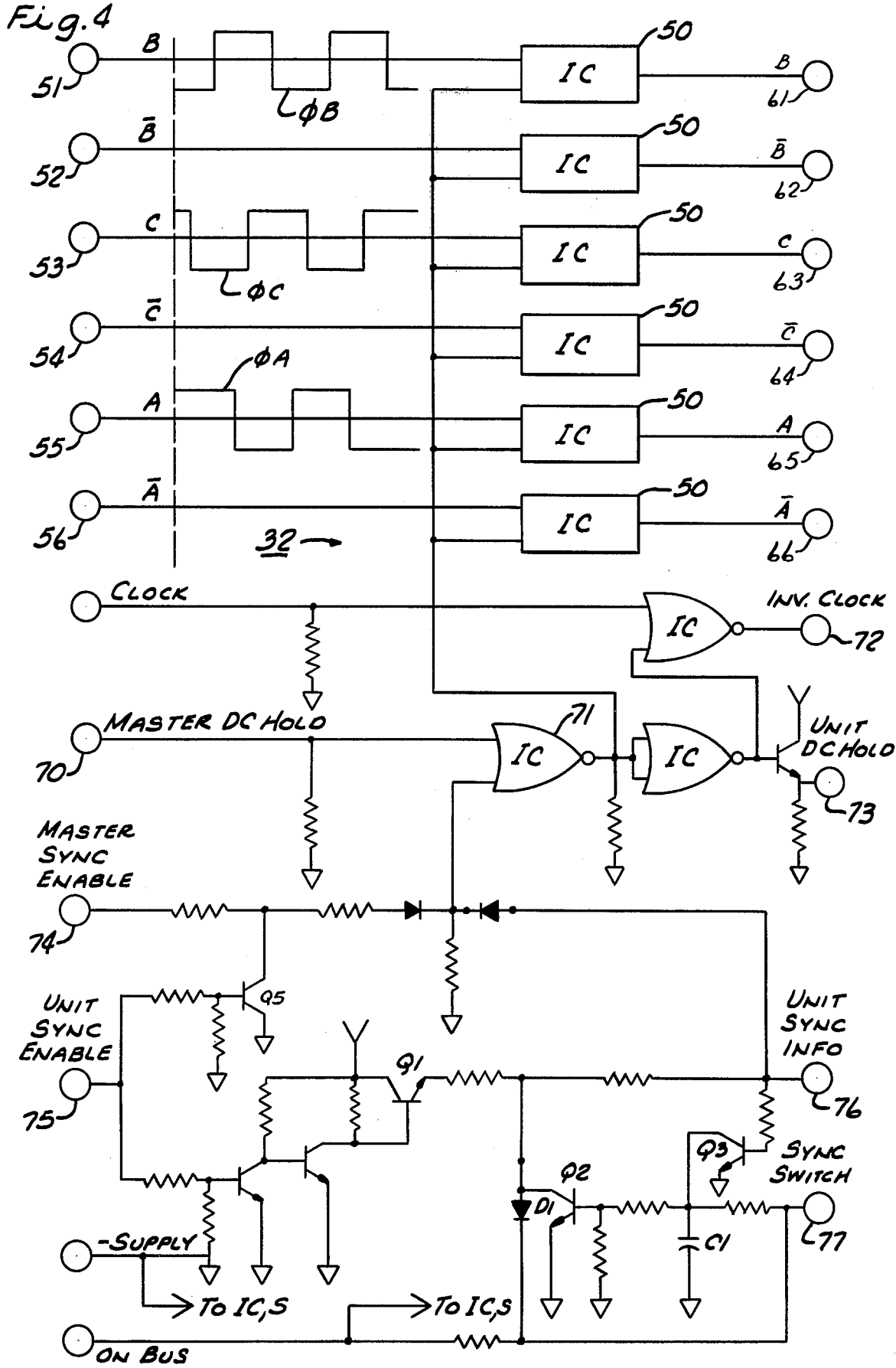
FIG. 4 is a schematic diagram illustrating the sync and delay circuits of the inverters shown in FIGS. 2 and 3.

Referring next to FIG. 4, this Figure schematically illustrates sync and delay circuit 32 utilized in each of the AC inverters 16, 17 and 18. As previously described, this circuit 32 may be thought of as being divided into two parts, the transmission gate section consisting of integrated circuit gates 50 and the sync logic section, which consists of the remaining circuitry underlying transmission gates 50. The output from the one-phase to three-phase logic section 31 of inverter 16 is transmitted to terminals 51 through 56 of sync and delay circuit 32 of each inverter. This three-phase signal A, B, C is graphically illustrated at inputs 55, 51 and 53 as the three DC pulse sets $\phi A$, $\phi B$ and $\phi C$, respectively. It may be noted that the reciprocal of these three signals are also transmitted to the gate section of circuit 32 at terminals 56, 52 and 54. The reason the reciprocal wave forms are also transmitted to the gate section is so that the logic circuitry will not be confused and the logic circuitry of each stage will reset alike. In other words, when the logic circuitry also sees the reciprocal wave forms, it will be assured of proper identification and synchronization of each wave form $\phi A$, $\phi B$, and $\phi C$. Depending upon the conditions set up by the sync logic section of circuit 32, gates 50 will either all gate or all pass the three-phase set of pulses to output terminals 61 through 66 for transmission to amplifiers 33 through 35 as seen in FIGS. 2 and 3.

The master DC hold input at connection 70 has direct control of the board, since any high input on NOR gate 71 produces a low output. This in turn holds the transmission gates 50 off. This also forces the inverted clock output at terminal 72 low, and the unit DC hold at terminal 73 high. Inverter clock output at terminal 72 is transmitted to the motor amplifiers and gives a one pulse delay to insure that the power switching to the respective synchronous motor is not shorting out. The unit DC hold output at terminal 73 is transmitted to the variable voltage switching regulator 36 in the particular inverter and causes the respective AC synchronous motor to be held at a braked stop under a DC supply.

The master sync enable at terminal 74 has the same effect as the DC hold, in that a high at terminal 74 in essence places the inverter in the off mode.

When a downstream machine has been positioned in proper position synchronization for start-up, a unit sync enable signal or high will be transmitted to terminal 75 of the next preceding or upstream machine circuit 32. This unit sync information from a downstream inverter applied to the unit sync enable terminal 75, through transistor Q5 gates the master sync enable off and also turns on transistor Q1, which also enables the next sync output at terminal 76 which causes transmission of a high to the unit sync enable terminal 75 of the next upstream sync and delay inverter circuit. However, this next sync output at terminal 76 is held low until a high is received from the sync switch via detector 40 at the sync switch input terminal 77, indicating that the machine is in position synchronization.

If the sync switch level at terminal 77 is initially low, this holds the next sync output at terminal 76 low through diode D1. When sync switch terminal 77 goes high as a result of a detection from detector 40 (FIGS. 2 and 3), then the next sync terminal 76 goes high, telling the next upstream inverter to initiate position synchronization of its respective machine. This turns on transistor Q3, which holds capacitor C1 low and allows the next sync output 76 to remain high. Capacitor C1 holds transistor Q2 off long enough to make sure transistor Q3 is turned on.

If the sync switch output at terminal 77 is initially high (before the unit sync enable at terminal 75 is turned on), transistor Q2 is turned on. This holds the next sync output at terminal 76 low when the unit sync enable goes high. Thus, the sync switch connected to terminal 77 must go low and then high again before the next sync terminal 76 goes high. When the next sync terminal 76 goes high, the unit DC hold at terminal 73 goes high and that inverter shuts down. The next sync output at terminal 76 is then routed to the next upstream inverter to the unit sync enable terminal 75 of that inverter sync and delay circuit section 32. If it happens to be the lead inverter, the next sync output 76 of the lead inverter is fed to a sync complete gate in control section 19 of the lead inverter, which in turn, causes the master sync signal to be generated for transmission to all inverters. Obviously, this position synchronization operation of all machines may be carried on simultaneously instead of positioning the machines sequentially.

Thus, with the circuitry described, the position sensors 40 on each machine in the line indicate respectively when each machine is in a start position, which is synchronized with the start position of the other machines in the line. When this occurs, the sensors 40 (FIGS. 2 and 3) generate respective electrical position signals or highs, which are the sync switch signals transmitted to terminal 77 of circuit 32 (FIG. 4) when the respective machines are in their start positions and thus circuits 32 detect the presence of these position signals. Each circuit 32 also causes its respective AC synchronous motor to be driven until its respective machine advances to its start position, and then they respectively stop and hold each machine with the unit DC hold signal as they attain their respective start position. Then when all machines are in position synchronization, the lead inverter will cause simultaneous initiating drive of all of the motors in phase synchronization with their respective amplified three-phase sets of drive pulses when the simultaneous presence of the electrical position signals from detectors 40 of all machines is detected, thereby indicating that all machines in the line are in position synchronization with each other.

I claim:

1. In a manufacturing or packaging assembly line system having a plurality of machines driven by respective AC synchronous motors and adapted to sequentially conduct successive steps of manufacture or packaging on articles moving in the assembly line, a drive control for synchronously driving said AC synchronous motors, said drive control including a plurality of AC inverters having polyphase variable frequency output signals consisting of polyphase sets of series of controlled frequency low voltage DC pulses which are amplified to respectively drive said motors at synchronized speeds, the improvement comprising circuit means in one of said inverters for generating one of said low voltage polyphase DC pulse sets and for transmitting said one low voltage polyphase DC pulse set to the remaining inverters for respective amplification by all inverters to thereby provide said respective polyphase output signals with positive phase synchronization.

2. The drive control of claim 1, including means to vary the frequency of said one low voltage polyphase DC pulse set.

3. The drive control of claim 1, wherein said polyphase output signals are three-phase.

4. The drive control of claim 1, wherein each of said inverters includes transmission gate means to gate the transmission of said one low voltage polyphase DC pulse set before amplification thereof to each respective motor for controlled energization of the motors, and including logic circuit means having position sensors on each machine to sense when the machines in the assembly line are in position synchronization with each other and adapted to open said gate means of each inverter when all machines are in position synchronization to synchronously drive the respective motors.

5. The drive control of claim 5, wherein said logic circuit means includes means to drive said motors and then automatically brake and hold each motor when its corresponding machine attains position synchronization as sensed by said position sensors until all machines are in position synchronization.

6. A method of synchronously driving a plurality of AC synchronous motors in phase synchronization in a manufacturing or packaging assembly line having a plurality of machines respectively driven by the motors, comprising the steps of, inverting an AC current supply with a plurality of AC inverters corresponding in number to the plurality number of said motors to be driven to thereby provide a corresponding plurality of polyphase variable frequency output signals respectively from said inverters consisting of amplified polyphase sets of series of low voltage DC pulses, and respectively driving said motors with said amplified polyphase sets of pulses, the improvement comprising the steps of generating one of said low voltage polyphase DC pulse sets in one of the inverters, and transmitting said one low voltage polyphase DC pulse set to the remaining inverters for respective amplification by all inverters to thereby provide said respective amplified polyphase output signals with positive phase synchronization.

7. The method of synchronously driving a plurality of AC synchronous motors as set forth in claim 6, including the step of varying the frequency of said one polyphase set of pulses to a predetermined value corresponding to the desired speed at which the motors are to be synchronously driven.

8. The method of synchronously driving a plurality of AC synchronous motors as set forth in claim 6, wherein said polyphase set of signals is generated to be three-phase.

9. The method of synchronously driving a plurality of AC synchronous motors as set forth in claim 6, including the steps of, positioning a position sensor on each machine in the line to indicate respectively when each machine is in a start position which is synchronized with the start position of the other machines in the line for position synchronization of the line, generating respective electrical position signals with said position sensors when the respective machines are in their start positions and detecting the presence of said position signals, driving each of said motors until their respective machines advance to their start positions and then respectively stopping and holding each machine as it attains its respective start position by utilizing said electrical position signals to initiate respective DC hold brakes on said motors, and then simultaneously initiating drive of all of said motors in phase synchronization with their respective amplified polyphase sets of drive pulses when the simultaneous presense of said electrical position signals from all machines is detected, thereby indicating that all machines in the line are in position synchronization with each other.

* * * * *